United States Patent [19]

Kilger et al.

[11] Patent Number: 4,594,503

[45] Date of Patent: Jun. 10, 1986

[54] APPARATUS FOR STABILIZING THE SCANNING DIRECTION IN AN IMAGE FIELD SCANNING DEVICE

[75] Inventors: Fridbert Kilger, Munich; Siegfried Roth, Ottobrunn; Rupert Breithaupt, Egmating; Jupp Menke, Gluecksburg; Günter Zeifang, Neckargemuend, all of Fed. Rep. of Germany

[73] Assignee: Messerschmitt-Boelkow-Blohm Gesellschaft mit beschraenkter Haftung, Munich, Fed. Rep. of Germany

[21] Appl. No.: 545,788

[22] Filed: Oct. 27, 1983

[30] Foreign Application Priority Data

Nov. 11, 1982 [DE] Fed. Rep. of Germany ....... 3241752

[51] Int. Cl.⁴ .................................................. G01J 1/20
[52] U.S. Cl. ................................. 250/203 R; 250/578; 244/3.16
[58] Field of Search ................ 356/152; 358/125, 213, 358/212; 244/3.16, 3.17; 250/578, 203 R, 234-236; 350/6.1, 6.5-6.91

[56] References Cited

U.S. PATENT DOCUMENTS

| | | | |
|---|---|---|---|
| 4,108,400 | 8/1978 | Groutage et al. | 244/3.16 |
| 4,133,004 | 6/1979 | Fitts | 244/3.16 |
| 4,224,507 | 9/1980 | Gendreu | 356/152 |
| 4,439,788 | 5/1984 | Frame | 250/578 |
| 4,500,051 | 2/1985 | Cottle, Jr. et al. | 244/3.16 |

Primary Examiner—David C. Nelms
Assistant Examiner—Michael Messinger
Attorney, Agent, or Firm—W. G. Fasse; D. H. Kane, Jr.

[57] ABSTRACT

In scanning an image field, for example an image field radiating infrared radiation sensed by an infrared sensor, at least one, preferably two, electronically controlled scanners are used. The respective scanning directions extend perpendicularly relative to each other. Changes in these scanning directions are determined with the aid of a reference signal generator providing horizontal and vertical deviation signals with reference to a central or mean view direction. The central or mean view direction of at least one of the scanners, preferably of both scanners is then varied or corrected in a closed loop feedback circuit in response to the deviation signals so that the central or mean view direction is restored and maintained. Preferably, any horizontal or azimuth scanning deviation from the central or mean viewing direction is corrected by shifting the respective image points stored in a memory in a correction direction in response to the respective horizontal or azimuth deviation signal. The vertical or elevational scanning direction is corrected by correcting the drive signal for the vertical scanner in response to a respective vertical or elevational deviation signal.

4 Claims, 1 Drawing Figure

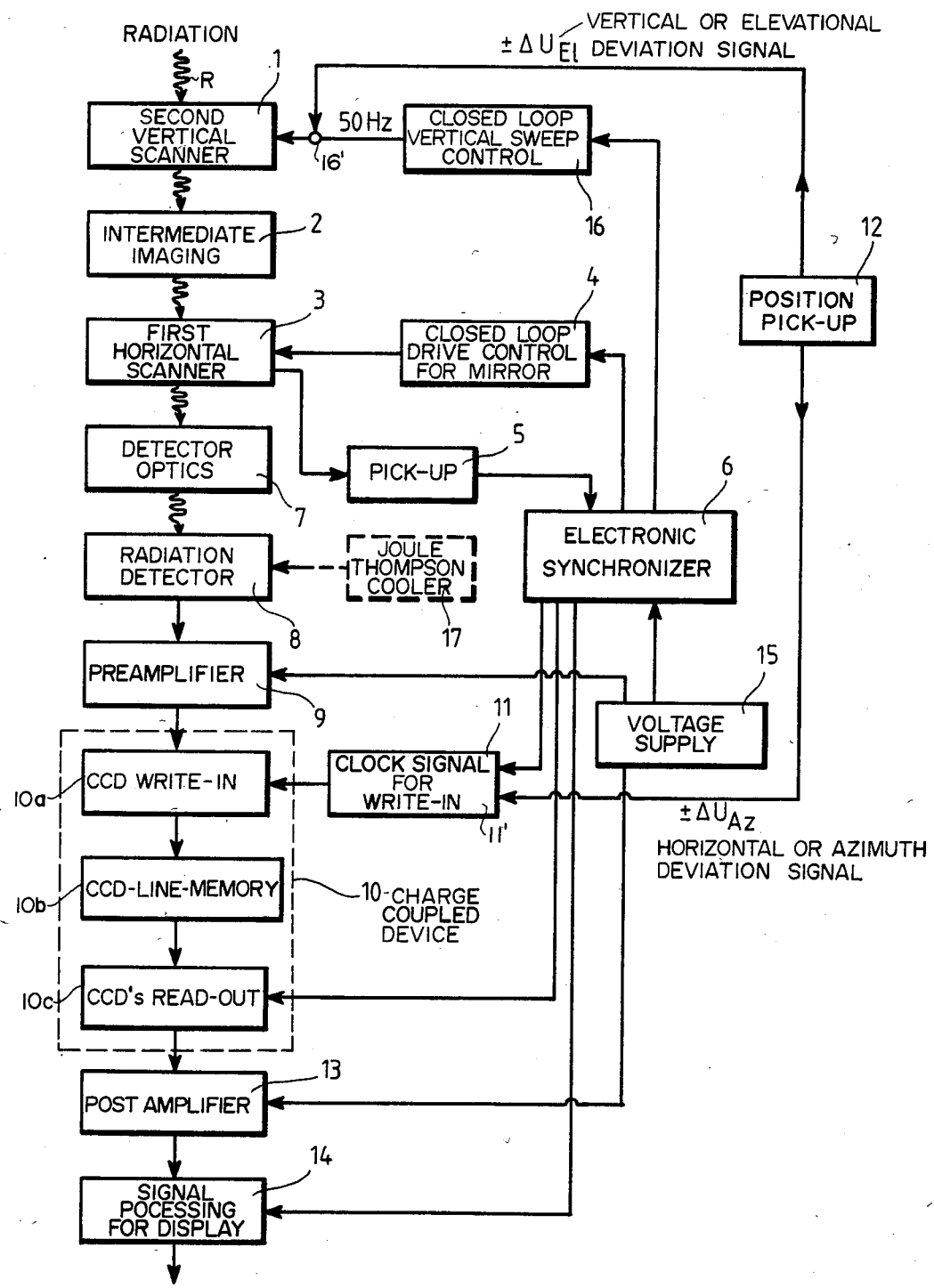

APPARATUS FOR STABILIZING THE SCANNING DIRECTION IN AN IMAGE FIELD SCANNING DEVICE

BACKGROUND OF THE INVENTION

1. Field of the Invention

The invention relates to a circuit arrangement for stabilizing the scanning direction in an image field scanning device such as an infrared scanning device or the like.

2. Description of the Prior Art

European patent application No. 0,051,274 describes an apparatus for scanning an image field with two scanners. One scanner sweeps or scans image lines with a high sweep or scanning speed in the horizontal direction. The other scanner causes the scanning or sweeping of the image or rather, the half image with a slow scanning speed perpendicularly to the first scanning direction extending horizontally. Thus, the image field is scanned linearly with a constant angular speed. The prior art apparatus comprises a signal receiver functioning as a detector which is imaged by an optical system in infinity. It is desirable, that such an image field scanning apparatus is stabilized with regard to its scanning direction relative to a rated or desired scanning direction also referred to as central or mean scanning direction or rather, view direction. To achieve such stabilization it might be feasible to mount the entire scanning apparatus on a stabilized platform. A stabilized platform is not only expensive, it might not be suitable for certain applications, such as in connection with an infrared scanner.

OBJECTS OF THE INVENTION

In view of the above it is the aim of the invention to achieve the following objects singly or in combination:

to provide a simple, yet effective and economical directional stabilization of a scanner such as an infrared scanner without the need for a stabilized platform;

to generate at least one deviation signal as a difference signal between a rated direction and an actually measured view direction of the scanning and to use such deviation signal for the correction of the scanning direction;

to produce two deviation signals, one for a vertical or elevational deviation, and one for a horizontal or azimuth deviation and to use such deviation signals for the required correction of the scanning directions; and to provide a circuit arrangement for performing the just outlined directional stabilization and corrections.

SUMMARY OF THE INVENTION

According to the invention the scanning direction of an image field scanning device is stabilized by a circuit arrangement having two scanners operational in directions extending substantially perpendicularly to each other. The first and second scanners are controlled by respective first and second electronic control means. A reference generator or position pick-up produces at least one deviation signal signifying a deviation of the scanning direction of the respective first or second scanner from a defined central or mean viewing direction. A signal combining circuit component such as an adder is connected to the output of the respective control member and to an output of the reference generator for combining the deviation signal with a control signal and to use the combined signals for correcting the scanning direction of the respective scanner back to the central or mean view direction.

In a preferred embodiment according to the invention a first scanner, preferably in the form of a rotating polygonal mirror, scans the image points along an image line and the output of the polygonal mirror is received by a detector followed by an image point memory. A second scanner, preferably in the form of an oscillating tilting mirror, which scans in a vertical direction, causes the image line change. In such a circuit arrangement the horizontal or azimuth deviation signal from the reference generator is used to cause a respective displacement of the image points in the image point memory. The vertical or elevational deviation signal from the reference generator is used for a respective displacement of the center point position of the second scanner. Thus, preferably, any horizontal or azimuth scanning deviation from a central or mean viewing direction is corrected by shifting the respective image points stored in a memory in a correction direction in response to the respective horizontal or azimuth deviation signal while the vertical or elevational scanning direction is corrected by correcting the drive signal for the vertical scanner in response to a respective vertical or elevational deviation signal.

BRIEF FIGURE DESCRIPTION

In order that the invention may be clearly understood, it will now be described, by way of example, with reference to the single figure of the accompanying drawings which shows a circuit diagram in block form illustrating the present invention.

DETAILED DESCRIPTION OF A PREFERRED EXAMPLE EMBODIMENT AND OF THE BEST MODE OF THE INVENTION

Radiation R coming from a source such as an infrared radiation source not shown, is received by a second scanner 1, for example in the form of a tilting mirror which is tiltable vertically up and down to provide a vertical or elevational scanning. A second closed loop control 16 is operatively connected to a control input or drive of the tilting mirror 1 for causing the scanning or vertical sweep movements of the tilting mirror 1. The output signal of the second closed loop or vertical sweep control 16 is connected to one input of an adding or signal combining circuit 16' having another input connected to a reference generator 12 to be described in more detail below. For example, the vertical sweeping or tilting movements of the mirror 1 may have a repetition frequency of 50 Hz.

The output of the tilting mirror 1 is received by an intermediate imaging device 2 which in turn transmits the radiation to a first horizontal or azimuth scanner 3, preferably in the form of a rotating polygonal mirror. The first scanner or polygonal mirror 3 is rotated at high speed under the control of a first closed loop drive control 4 which rotates the polygonal mirror 3 for example, at an r.p.m. of 14,625, thereby providing a high scanning speed of a horizontal image line. A rotational angle pick-up member 5 is operatively connected to the rotational axis of the polygonal mirror 3 to provide a closed loop feedback signal to an electronic synchronizing unit 6 which provides output signals to all components of the system including the first closed loop drive control 4 of the mirror 3 and the second closed loop vertical sweep control 16 of the mirror 1. The radiation from the output of the polygonal mirror 3 is received by a detector optical unit 7 which in turn directs its output onto a radiation detector 8 which converts the radiation into a respective electrical signal. In case the received radiation is infrared radiation the radiation detector 8 is operatively connected to a conventional cooling device 17 such as a Joule Thompson-cooler. Such a cooler 17 keeps the radiation detector 8 at an operating temperature of about 77° K.

The electrical output signals of the radiation detector 8 are amplified by a preamplifier 9, the output of which is connected to the write-in unit 10a of a charge coupled device 10. The write-in unit 10a is connected to a line memory 10b of the charge coupled device 10. A read-out unit 10c is connected with its input to the line memory 10b and with its output to a post amplifier 13. The output of the post amplifier 13 is connected to a signal processing unit 14 which processes the signals for display on a display unit not shown.

The electronic synchronizing unit 6 is connected with respective outputs to a clock signal generator 11 which controls the write-in operation, to an input of the read-out unit 10c and also to an input of the signal processing unit 14. A power supply unit 15 is connected to the synchronizing unit 6 as well as to the preamplifier 9 and to the post amplifier 13.

According to the invention the directional stabilization is accomplished by producing at least one deviation signal $\Delta U_{EL}$ representing a vertical or elevational deviation signal. Such vertical or elevational deviation signal is produced by a reference generator 12 or position pick-up connected with its respective output to the above mentioned signal combining circuit or adder 16' which also receives the 50 Hz drive signal from the vertical sweep control 16. The combined signal is then used for controlling the vertical sweep of the second scanner 1.

In the preferred embodiment the reference generator 12 or pick-up senses position disalignments to produce two deviation signals, namely the vertical or elevational deviation signal $\Delta U_{EL}$ mentioned above and a further horizontal or azimuth deviation signal $\Delta U_{AZ}$. For this purpose the respective output of the reference generator 12 is connected to a signal combining circuit member such as a signal adder 11' forming part of the clock signal circuit 11 for the write-in control. Thus, the write-in control provides a combined signal including the clock signal and the horizontal or azimuth deviation signal $\Delta U_{AZ}$. In this manner the write-in is displaced in time, which corresponds to a displacement of an image line to the left or right. In this manner each scanned image line and thus the viewing direction in the azimuth direction is also stabilized as far as a central or mean viewing direction is concerned.

The reference generator or position pick-up 12 may, for example be a universal gyro supported by universal joint means and provided with electrical output terminals secured to the frame of the suspension system. The deviation signal $\Delta U_{EL}$ corresponds, for example, to an angular deviation of a central or mean viewing direction of the scanner 1. Preferably, the frequency of the vertical or elevational deviation signal $\Delta U_{EL}$ should be lower than the sweep or tilting frequency of the vertical deflection scanner or mirror 1. Similarly, the horizontal or azimuth deviation signal represents the excursion of an image line to the right or left from a center point.

Although the invention has been described with reference to specific example embodiments, it will be appreciated, that it is intended, to cover all modifications and equivalents within the scope of the appended claims.

What is claimed is:

1. A circuit arrangement for stabilizing the scanning direction of an image field scanning device subject to motions, comprising first scanning means (3) for scanning an image in one direction, second scanning means (1) for scanning the image in a second direction, said first and second directions extending substantially perpendicularly to each other, first and second control means operatively connected to said respective first and second scanning means for controlling the scanning operation, pick-up means (12) for sensing position disalignments caused by said motion to produce at least one deviation signal signifying a deviation of a central viewing direction, signal combining means, conductor means operatively connecting one input of said signal combining means to the respective control means and another input of said signal combining means to an output of said pick-up means for combining said deviation signal with a control signal.

2. The circuit arrangement of claim 1, wherein said pick-up means comprise signal comparing means for comparing a rated reference signal representing said central viewing direction, with an actual scanning direction representing signal sensed by said pick-up means for producing said deviation signal ($\Delta U_{EL}$, $\Delta U_{AZ}$).

3. The circuit arrangement of claim 1, wherein said first scanning means (3) provide a horizontal or azimuth scanning of an image line of the image field, said circuit arrangement further comprising detector means (7, 8) operatively connected to said horizontal first scanning means, and image line memory means (10) operatively connected to said detector means for storing image points representing information, wherein said second scanning means (1) provide a vertical scanning of an image field by changing the image line scan of said first scanning means, and wherein said pick-up means comprises first sensor means for producing a first horizontal deviation signal ($\Delta U_{AZ}$) signifying a deviation of the first horizontal scanning means (3) and second sensor means for producing a second vertical deviation signal ($\Delta U_{EL}$) signifying a deviation of the second vertical scanning means, said signal combining means comprising first and second signal combining members (11, 16') connected to the respective first and second deviation signal producing sensor means of said pick-up means, said first signal combining member (11) being connected to said image line memory means (10) for shifting image points in said image line memory means (10) in a correcting direction in response to said first horizontal deviation signal ($\Delta U_{AZ}$), said second signal combining member (16') being connected to said second vertical scanning means (1) for shifting the central position of said second vertical scanning means in a correcting direction in response to said second vertical deviation signal ($\Delta U_{EL}$).

4. The circuit arrangement of claim 3, wherein said pick-up means comprise first and second signal comparing means for producing said first horizontal or azimuth deviation signal ($\Delta U_{AZ}$) and for producing said second vertical or elevational deviation signal ($\Delta U_{EL}$).

* * * * *